United States Patent Office 2,744,940
Patented May 8, 1956

2,744,940

CHLORINATION OF SATURATED HYDROCARBONS

Herman Pines, Chicago, Ill., assignor to Universal Oil Products Company, Chicago, Ill., a corporation of Delaware No Drawing. Application July 10, 1952,
Serial No. 298,195

14 Claims. (Cl. 260—648)

This application is a continuation-in-part of my copending application Serial No. 75,081, filed February 7, 1949, now abandoned.

This invention relates to a process for chlorinating cycloparaffinic hydrocarbons and particularly for chlorinating alkylcycloparaffinic hydrocarbons containing a tertiary carbon atom.

An object of this invention is to produce a monochloride of a cycloparaffinic hydrocarbon.

Another object of this invention is to produce an alkyl-monochloroalkane in which the alkyl group and the chlorine atom are attached to the same carbon atom.

One embodiment of this invention relates to a process for producing a chlorinated cycloparaffinic hydrocarbon which comprises reacting a cycloparaffinic hydrocarbon with a chlorine transfer agent to form a monochloride of said cycloparaffin in the presence of at least one mineral acid catalyst selected from the group consisting of sulfuric acid and phosphoric acid.

Another embodiment of this invention relates to a process for producing a monochloride of an alkylcycloparaffin which comprises reacting an alkylcycloparaffin containing a tertiary carbon atom, a branched-chain olefin, and a sufficient amount of hydrogen chloride to form an isoparaffin and a monochloride of said alkylcycloparaffin in the presence of at least one mineral acid catalyst selected from the group consisting of sulfuric acid and phosphoric acid.

A further embodiment of this invention relates to a process for producing a monochloride of an alkylcycloparaffin which comprises reacting an alkylcycloparaffin containing a tertiary carbon atom and a sufficient amount of a branched-chain chloroalkane, to form an isoparaffin and a monochloride of said alkylcycloparaffin in the presence of at least one mineral acid catalyst selected from the group consisting of sulfuric acid and phosphoric acid.

A still further embodiment of this invention relates to a process for producing a monochloride of an alkylcycloparaffin which comprises reacting an alkylcycloparaffin containing a tertiary carbon atom, a branched-chain chloroalkane, and a sufficient amount of hydrogen chloride to form an isoparaffin and a monochloride of said alkylcycloparaffin in the presence of at least one mineral acid catalyst selected from the group consisting of sulfuric acid and phosphoric acid.

I have found that an alkylcycloparaffin containing a tertiary carbon atom, and a chlorine transfer agent such as a branched-chain chloroalkane, or a branched-chain chloroalkane plus hydrogen chloride, or a branched-chain olefinic hydrocarbon plus hydrogen chloride, react in the presence of a sulfuric acid or a phosphoric acid catalyst to form an isoparaffin and a monochloride of an alkylcycloparaffin in which the chlorine atom and alkyl group are attached to the same carbon atom of the cycloparaffinic ring. Thus, methylcyclohexane, isobutylene, and hydrogen chloride react in the presence of a concentrated sulfuric acid catalyst at a temperature of from about −30° to about 80° C., to form isobutane and 1-methyl-1-chlorocyclohexane.

Similarly, tert-butyl chloride and tert-amyl-chloride, which are chlorine transfer agents, react with methylcyclohexane and 1,4-dimethylcyclohexane to form 1-methyl-1-chlorocyclohexane, and 1,4-dimethyl-1-chlorocyclohexane respectively, in the presence of at least one mineral acid catalyst selected from the members of the group consisting of sulfuric acid and phosphoric acid.

The cycloparaffinic hydrocarbons which are utilizable as starting materials in this process comprise the alkylcycloparaffins containing a tertiary carbon atom and include methylcyclohexane, certain dimethylcyclohexanes such as 1,2 - dimethylcyclohexane, 1,3 - dimethylcyclohexane, 1,4 - dimethylcyclohexane, certain trimethylcyclohexanes such as 1,1,2 - trimethylcyclohexane, 1,1,3 - trimethylcyclohexane, 1,1 - 4 - trimethylcyclohexane, 1,2,3 - trimethylcyclohexane, 1,2,4 - trimethylcyclohexane, etc., ethylcyclohexane, propylcyclohexane, etc., methylcyclopentane, certain dimethylcyclopentanes, such as 1,2 - dimethylcyclopentane, 1,3 - dimethylcyclopentane, certain trimethylcyclopentanes, such as 1,1,2 - trimethylcyclopentane, 1,1,3 - trimethylcyclopentane, 1,2,3 - trimethylcyclopentane, 1,2,4 - trimethylcyclopentane, etc., and higher boiling monoalkylcycloalkanes, and poly-alkylcycloalkanes having at least one nuclear hydrogen atom attached to a tertiary carbon atom. Of the various methylcyclohexanes, methylcyclohexane and 1,4 - dimethylcyclohexane are particularly desirable as starting materials for this purpose.

The chlorine transfer agents which are useful in this process are such that the chloride of the chlorine transfer agent can undergo hydrogen-halogen exchange with a hydrogen atom of the cycloparaffin. Thus a branched-chain olefinic hydrocarbon may first be reacted with hydrogen chloride to form a branched-chain monohaloalkane which is reacted with the alkylcycloparaffin in the presence of the above-mentioned mineral acid catalyst to form a monochloride of the cycloparaffin. Tert-monoolefins such as isobutylene are preferred in this process, but other branched-chain monoolefins such as isopropylethylene, sec-butylethylene, etc., may also be used. Branched-chain monohaloalkanes which are useful in this process are those which are tert-chloroalkanes or alkyl chlorides which can produce a tert-chloroalkane during the operation of this process.

In addition to the branched-chain olefins, there are other olefin-acting compounds that may be used as starting materials in this process. For example, diolefins, polyolefins, and certain alcohols, esters and ethers which may produce transitory olefin-acting intermediates are utilizable during the operation of this process.

The catalysts useful for promoting the formation of monochlorinated cycloparaffins as hereinbefore set forth include sulfuric acid, and particularly sulfuric acid of from about 92 to about 100% acid concentration, a phosphoric acid such as orthophosphoric acid, pyrophosphoric acid, or a polyphosphoric acid which is formed by heating orthophosphoric acid or pyrophosphoric acid, and mixtures of sulfuric acid and phosphoric acid.

The operating conditions used in this process are dependent upon the nature of the hydrocarbons being treated and also upon whether sulfuric acid or phosphoric acid is selected at the catalyst for the reaction. When utilizing sulfuric acid, the process is carried out at a temperature of from about −30° C. to about 100° C. and at pressures up to about 100 atmospheres, although higher pressures may be used if desirable. When using concentrated sulfuric acid, the preferred operating temperatures are from about 0° to about 50° C. Phosphoric acid catalysts generally require slightly higher temperatures and when using such a catalyst, temperatures of from about 25° to about 200° C. are desirable.

This process is carried out in either batch or continuous type operation. In a typical batch operation, sulfuric acid of about 96% $H_2SO_4$ concentration and methylcyclohexane were charged to a reactor immersed in an ice bath and provided with a mechanically driven stirrer and then hydrogen chloride was passed into the reaction mixture with stirring until the mixture became saturated with hydrogen chloride. The olefinic hydrocarbon such as isobutylene was then added to the resultant reaction mixture. The rates of addition of isobutylene and hydrogen chloride were so adjusted that the reaction temperature was maintained between about 5 and 10° C. while an excess of hydrogen chloride was passed through the reactor. When all of the isobutylene was added, the reaction mixture was stirred until the reaction temperature approached 0° C., when the addition of hydrogen chloride and stirring were stopped. The product of the reaction consisted of two layers, namely, an upper organic layer and a lower used sulfuric acid layer. The upper layer comprising essentially the organic reaction product was washed with water, neutralized with an aqueous solution of bicarbonate, and then dried over potassium carbonate and distilled to separate the lower boiling tertiary-butyl chloride from the unconverted methylcyclohexane solvent and the 1-methyl-1-chlorocyclohexane formed in the process.

The process may also be carried out continuously by simultaneously charging an alkylcycloparaffin, a mineral acid catalyst, and a branched-chain olefinic hydrocarbon and hydrogen chloride or a tert-alkyl chloride with or without the addition of hydrogen chloride to a reaction zone provided with baffles or other suitable mixing means. The resultant reaction products are then directed from the reaction zone to a separating zone in which an upper layer of organic material is separated from the lower sulfuric acid layer. The upper layer is then washed with water and caustic soda solution to remove unconverted hydrogen chloride and then washed and dried organic materials are then finally distilled to recover the desired reaction products and to obtain tert-alkyl halide which is recycled to the process.

The monochlorides of the alkyl cycloparaffins formed by this process are useful as intermediates in the synthesis of various organic compounds, such as insecticides, etc., and may themselves be used as solvents for various organic materials, and are particularly useful as solvents for highly chlorinated insecticides such as DDT, Chlordane, etc.

The following examples are given to illustrate the operation of this process, but these data are given with no intention of unduly limiting the generally broad scope of the invention.

EXAMPLE I 38 grams (0.39 mols) of methylcyclohexane and 37 grams of 96% sulfuric acid were cooled to 2° C. and this mixture was saturated with a stream of anhydrous hydrogen chloride with stirring. After saturation, the stirring was continued for one hour during which time 53 grams (0.95 mols) of isobutylene were added. During this addition of isobutylene, anhydrous hydrogen chloride was continuously bubbled through the reaction flask and the reactants were maintained at a temperature less than 10° C. The resultant reaction product was separated from the used sulfuric acid layer and then washed with water and caustic soda solution, dried and distilled to separate 31 grams of unconverted methylcyclohexane and 8 grams of 1-methyl-1-chlorocyclohexane. Tert-butyl chloride was formed in an amount corresponding to 45 mol per cent of the quantity of isobutylene charged originally.

EXAMPLE II

Several runs were made in which tert-butyl chloride and isoprene dihydrochloride (also referred to as 1,3-dichloro-3-methylbutane) were reacted with an alkylcycloparaffin, namely, methylcyclohexane, and 1,4-dimethylcyclohexane in the presence of hydrogen chloride and sulfuric acid of 96% concentration at temperatures of from about 0° to about 30° C. and for times of from about two to about eighteen hours as indicated in the table:

Table

| Experiment No. | 1 | 2 | 3 | 4 | 5 | 6 |
|---|---|---|---|---|---|---|
| Reagents used: | | | | | | |
| Haloalkane, kind | t-butyl chloride | t-butyl chloride | t-butyl chloride | t-butyl chloride | t-butyl chloride | Isoprene dichloride. |
| g | 47 | 47 | 47 | 48 | 97 | 47. |
| m | .5 | .5 | .5 | .5 | 1.0 | .37. |
| Branched-chain saturated hydrocarbon, kind. | methylcyclohexane. | methylcyclohexane. | 1,4-dimethylcyclohexane. | 1,4-dimethylcyclohexane. | 1,4-dimethylcyclohexane. | 1,4-dimethylcyclohexane. |
| g | 73 | 73 | 84 | 85 | 170 | 73. |
| m | .75 | .75 | .75 | .76 | 1.5 | .5. |
| Sulfuric Acid, 96% | 35 | 37 | 36 | 38 | 54 | 36. |
| Hydrogen chloride | yes | yes | yes | no | yes | yes. |
| Experimental conditions: | | | | | | |
| Temp., °C | 0–2 | 24–29 | 22–24 | 27 | 29 | 23–25. |
| Time, hours | 18 | 2 | 2.7 | 2.3 | 3.2 | 2.2. |
| Results obtained: Acid layer, g | 35 | 39.5 | 37 | 41.1 | 54 | 39.7. |
| Halides formed during reaction, kind | 1-chloro-1-methylcyclohexane. | 1-chloro-1-methylcyclohexane. | 1-chloro-1,4-dimethylcyclohexane. | 1-chloro-1,4-dimethylcyclohexane. | 1-chloro-1,4-dimethylcyclohexane. | 1-chloro-1,4-dimethylcyclohexane. |
| Yield, Mol percent based on haloalkane chg. | 23 | 34 | 41 | 31 | 43 | 3. |
| Yield, Mol percent based on haloalkane reacted. | 47 | 38 | 47 | 36 | 46 | 9. |
| Haloalkane recovered, Mol percent | 50 | 11 | 13 | 14 | 7 | 64. |
| Isobutane formed based on tertiary butyl chloride reacted, Mol percent. | 50 | 41 | 46 | 46 | 41 | | t-Butyl chloride reacts with methylcyclohexane in the presence of 96% sulfuric acid and hydrogen chloride to form 1-methyl-1-chlorocyclohexane. The reaction proceeds slowly at 0° and much faster at room temperature. At 0° after 18 hours of contact time 23% of t-butyl chloride reacted to form 1-methyl-1-chlorocyclohexane. On the basis of a total t-butyl chloride entering reaction the yield was 47%. At 24–29° after two hours of contact time the respective yields of 1-methyl-1-chlorocyclohexane were 34 and 38 mol per cent based upon the amounts of t-butyl chloride charged and reacted. Also, 1,4-dimethylcyclohexane under the above indicated conditions reacted readily with t-butyl chloride to form 1,4-dimethyl-1-chlorocyclohexane. The addition of hydrogen chloride during the reaction improves the yields of the 1,4-dimethyl-1-chlorocyclohexane; in the presence of hydrogen chloride the yield of the organic chloride was 42% and in the absence of hydrogen chloride it was 36%. The t-butyl chloride used in the reaction was converted partially into isobutane.

It was found that dichlorides such as isoprene dihydrochloride react with alkylcycloparaffins to cause a hydrogen-halogen exchange; about 9 mol per cent of 1,4-dimethyl-1-chlorocyclohexane was produced.

I claim as my invention:

1. A process for producing a monochloride of an alkylcycloparaffin which comprises reacting an alkylcycloparaffin containing a tertiary carbon atom and having at least 6 carbon atoms per molecule and a tertiary chloroalkane to form a monochloride of said alkylcycloparaffin and an isoparaffin in the presence of hydrogen chloride and at least one mineral acid catalyst selected from the group consisting of sulfuric acid and phosphoric acid at a reaction temperature of from about $-30°$ to about $200°$ C.

2. A process for producing a monochloride of an alkylcycloparaffin which comprises reacting an alkylcycloparaffin containing a tertiary carbon atom and having at least 6 carbon atoms per molecule, a tertiary chloroalkane, and a sufficient amount of hydrogen chloride to form a monochloride of said alkylcycloparaffin and an isoparaffin in the presence of sulfuric acid at a temperature of from about $-30°$ C. to about $100°$ C.

3. A process for producing a monochloride of an alkylcycloparaffin which comprises reacting an alkylcycloparaffin containing a tertiary carbon atom and having at least 6 carbon atoms per molecule and a sufficient amount of a tertiary chloroalkane and of hydrogen chloride to form a monochloride of said alkylcycloparaffin and an isoparaffin in the presence of phosphoric acid at a temperature from about $25°$ C. to about $200°$ C.

4. A process for producing a monochloride of an alkylcycloparaffin which comprises reacting an alkylcycloparaffin containing a tertiary carbon atom and having at least 6 carbon atoms per molecule and a sufficient amount of a tertiary chloroalkane and of hydrogen chloride to form a monochloride of said alkylcycloparaffin and an isoparaffin in the presence of sulfuric acid or from about 92 to about 100% acid concentration at a temperature of from about $-30°$ to about $100°$ C.

5. The process defined in claim 4 further characterized in that said alkylcycloparaffin is methylcyclohexane.

6. The process defined in claim 4 further characterized in that said alkylcycloparaffin is 1,4-dimethylcyclohexane.

7. The process defined in claim 4 further characterized in that said tertiary chloroalkane is tert-butyl chloride.

8. A hydrogen-halogen exchange process which comprises reacting an alkylcycloalkane having 6 to 8 carbon atoms with tertiary butyl chloride in the presence of 92 to 100% sulfuric acid at a reaction temperature of about $+25°$ C. to $-25°$ C. in the presence of hydrogen chloride until a substantial amount of chloride of the alkylcycloalkane is formed, separating the resulting organic product from the sulfuric acid, washing said organic product to remove traces of sulfuric acid, and distilling the washed product to separate the hydrocarbon from the tertiary chlorocycloalkane produced.

9. A hydrogen-halogen exchange process which comprises reacting an alkylcycloalkane having 6 to 8 carbon atoms with tertiary butyl chloride in the presence of 92 to 100% sulfuric acid, and in the presence of hydrogen chloride at a temperature of from about $-30°$ C. to about $100°$ C. and for a time such that a substantial amount of chloride of the alkylcycloalkane is formed, separating the resulting organic product from the sulfuric acid, washing said organic product to remove traces of sulfuric acid, and distilling the washed product to separate the hydrocarbon from the tertiary chlorocycloalkane produced.

10. A hydrogen-halogen exchange process which comprises reacting an alkylcycloalkane having at least 6 carbon atoms per molecule and containing a tertiary carbon atom with a tertiary chloroalkane in the presence of at least one mineral acid catalyst selected from the group consisting of sulfuric acid and phosphoric acid at a reaction temperature of from about $-30°$ C. to about $200°$ C. until a substantial amount of chloride of the alkylcycloalkane is formed, separating the resultant organic product from the mineral acid catalyst and recovering the last-mentioned chloride from said organic product.

11. A hydrogen-halogen exchange process which comprises reacting an alkylcycloparaffinic hydrocarbon containing a tertiary carbon atom and having at least 6 carbon atoms per molecule with a tertiary chloroalkane in the presence of sulfuric acid of from about 92 to about 100% acid concentration at a temperature of from about $-30°$ to about $100°$ C. until a substantial amount of chloride of said hydrocarbon is formed, separating the resultant organic product from the sulfuric acid and recovering the last-mentioned chloride from the organic product.

12. A process for producing a monochloride of an alkylcycloparaffin which comprises reacting an alkylcycloparaffin containing a tertiary carbon atom and having at least 6 carbon atoms per molecule and a tertiary chloroalkane to form a monochloride of said alkylcycloparaffin and an isoparaffin in the presence of sulfuric acid at a temperature of from $-30°$ C. to about $100°$ C.

13. The process of claim 10 further characterized in that said tertiary chloroalkane is isoprene dihydrochloride.

14. The process of claim 11 further characterized in that said tertiary chloroalkane is isoprene dihydrochloride.

References Cited in the file of this patent
UNITED STATES PATENTS

| | | |
|---|---|---|
| 2,259,723 | Ballard et al. | Oct. 21, 1941 |
| 2,413,759 | Frey | Jan. 7, 1947 |
| 2,447,139 | Schmerling | Aug. 17, 1948 |
| 2,448,156 | Schmerling | Aug. 31, 1948 |
| 2,474,827 | Condon | July 5, 1949 |
| 2,646,453 | Condon | July 16, 1953 |